(12) United States Patent
Hwang et al.

(10) Patent No.: US 11,222,608 B2
(45) Date of Patent: Jan. 11, 2022

(54) DISPLAY DEVICE

(71) Applicant: Samsung Display Co., Ltd., Yongin-si (KR)

(72) Inventors: Hyun Sik Hwang, Hwaseong-si (KR); Bongim Park, Hwaseong-si (KR); Ikhyun Ahn, Hwaseong-si (KR); Shin Dasol, Cheonan-si (KR); Sang-Won Lee, Hwaseong-si (KR); Jikhan Jung, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/580,917

(22) Filed: Sep. 24, 2019

(65) Prior Publication Data

US 2020/0126500 A1    Apr. 23, 2020

(30) Foreign Application Priority Data

Oct. 18, 2018  (KR) .......................... 10-2018-0124316

(51) Int. Cl.
  *G09G 3/36*  (2006.01)
  *G02F 1/1362*  (2006.01)
(52) U.S. Cl.
  CPC ..... *G09G 3/3607* (2013.01); *G02F 1/136286* (2013.01); *G09G 3/3666* (2013.01); *G09G 2300/0443* (2013.01); *G09G 2320/0673* (2013.01)

(58) Field of Classification Search
  None
  See application file for complete search history.

(56) References Cited

U.S. PATENT DOCUMENTS

| 2013/0201180 A1* | 8/2013 | Jeon ..................... G09G 3/3648 345/419 |
| 2014/0198134 A1* | 7/2014 | Moon ...................... G09G 5/10 345/690 |
| 2018/0182328 A1 | 6/2018 | Hwang et al. |

\* cited by examiner

*Primary Examiner* — Nicholas J Lee
(74) *Attorney, Agent, or Firm* — Lewis Roca Rothgerber Christie LLP

(57) ABSTRACT

A display device includes a display panel including a first pixel and a second pixel, a reference gamma generator configured to generate a first reference gamma voltage and a second reference gamma voltage based on a driving mode, a stain compensator configured to output a stain compensating data that compensates a stain of an image data based on the driving mode, and a data driver configured to generate a first data voltage provided to the first pixel based on the first reference gamma voltage and the stain compensating data and a second data voltage provided to the second pixel based on the second reference gamma voltage and the stain compensating data.

18 Claims, 9 Drawing Sheets

| 1ST STAIN COMPENSATING VALUE (SC1) | | | | | | | |
|---|---|---|---|---|---|---|---|
| R1 | SC1_1 | R2 | SC1_2 | R3 | SC1_3 | R4 | SC1_4 |
| R5 | SC1_5 | R6 | SC1_6 | R7 | SC1_7 | R8 | SC1_8 |
| R9 | SC1_9 | R10 | SC1_10 | R11 | SC1_11 | R12 | SC1_12 |
| R13 | SC1_13 | R14 | SC1_14 | R15 | SC1_15 | R16 | SC1_16 |

132

| 2ND STAIN COMPENSATING VALUE (SC2) | | | | | | | |
|---|---|---|---|---|---|---|---|
| R1 | SC2_1 | R2 | SC2_2 | R3 | SC2_3 | R4 | SC2_4 |
| R5 | SC2_5 | R6 | SC2_6 | R7 | SC2_7 | R8 | SC2_8 |
| R9 | SC2_9 | R10 | SC2_10 | R11 | SC2_11 | R12 | SC2_12 |
| R13 | SC2_13 | R14 | SC2_14 | R15 | SC2_15 | R16 | SC2_16 |

| 1ST STAIN COMPENSATING VALUE (SC1) | | | | | | | |
|---|---|---|---|---|---|---|---|
| R1 | SC1_1 | R2 | SC1_2 | R3 | SC1_3 | R4 | SC1_4 |
| R5 | SC1_5 | R6 | SC1_6 | R7 | SC1_7 | R8 | SC1_8 |
| R9 | SC1_9 | R10 | SC1_10 | R11 | SC1_11 | R12 | SC1_12 |
| R13 | SC1_13 | R14 | SC1_14 | R15 | SC1_15 | R16 | SC1_16 |

| 2ND STAIN COMPENSATING VALUE (SC2) | | | | | | | |
|---|---|---|---|---|---|---|---|
| R1 | SC2_1 | R2 | SC2_2 | R3 | SC2_3 | R4 | SC2_4 |
| R5 | SC2_5 | R6 | SC2_6 | R7 | SC2_7 | R8 | SC2_8 |
| R9 | SC2_9 | R10 | SC2_10 | R11 | SC2_11 | R12 | SC2_12 |
| R13 | SC2_13 | R14 | SC2_14 | R15 | SC2_15 | R16 | SC2_16 |

DISPLAY DEVICE

CROSS-REFERENCE TO RELATED APPLICATION

This application claims priority to and the benefit of Korean Patent Application No. 10-2018-0124316 filed on Oct. 18, 2018 in the Korean Intellectual Property Office (KIPO), the entire content of which is incorporated herein by reference.

BACKGROUND

1. Field

An embodiment of the present invention relates to a display device.

2. Description of the Related Art

A liquid crystal display (LCD) panel includes a first substrate including a pixel electrode, a second substrate including a common electrode, and a liquid crystal layer between the first substrate and the second substrate. An electric field is generated by voltages applied to the pixel electrode and the common electrode. By adjusting an intensity of the electric field, the transmittance of light passing through the liquid crystal layer may be controlled so that an image may be displayed.

A stain, which is an abnormal luminance, may occur. For example, the stain can be a relatively high luminance or a relatively low luminance compared to an area adjacent to the stain. The stain may be a horizontal line, a vertical line, or a spot. A method of compensating an input image data in order to compensate the stain is studied.

SUMMARY

Aspects of some example embodiments are directed toward a display device capable of compensating a stain of a display panel.

According to example embodiments, a display device may include a display panel including a first pixel and a second pixel, a reference gamma generator configured to generate a first reference gamma voltage and a second reference gamma voltage based on a driving mode, a stain compensator configured to output a stain compensating data that compensates a stain of an image data based on the driving mode, and a data driver configured to generate a first data voltage provided to the first pixel based on the first reference gamma voltage and the stain compensating data and a second data voltage provided to the second pixel based on the second reference gamma voltage and the stain compensating data. The stain compensator may store a first stain compensating value and a second stain compensating value, and generate the stain compensating data by selecting one from the first stain compensating value, the second stain compensating value, and a third stain compensating value generated by interpolating the first stain compensating value and the second stain compensating value based on the driving mode.

In example embodiments, the first pixel may include a first red sub-pixel, a first green sub-pixel, and a first blue sub-pixel, and the second pixel may include a second red sub-pixel, a second green sub-pixel, and a second blue sub-pixel.

In example embodiments, the reference gamma generator may generate the first reference gamma voltage and the second reference gamma voltage having the same voltage level in a first driving mode, and the reference gamma generator may generate the first reference gamma voltage and the second reference gamma voltage having different voltage levels in a second driving mode and a third driving mode.

In example embodiments, a difference between the first data voltage and the second data voltage in the second driving mode may be greater than a difference between the first data voltage and the second data voltage in the third driving mode for a same grayscale value.

In example embodiments, the first stain compensating value may compensate the stain of the image data when the display panel is driven in the first driving mode, and the second stain compensating value may compensate the stain of the image data when the display panel is driven in the second driving mode.

In example embodiments, the stain compensator may select the first stain compensating value in the first driving mode, select the second stain compensating value in the second driving mode, and select the third stain compensating value in the third driving mode.

In example embodiments, the display device may not be driven by a spatial division pixel driving method in the first driving mode and the display device may be driven by a spatial division pixel driving method in the second driving mode and the third driving mode.

In example embodiments, the stain compensator may include a first memory configured to store the first stain compensating value, a second memory configured to store the second stain compensating value, a first calculator configured to generate the third stain compensating value by interpolating the first stain compensating value and the second stain compensating value, a second calculator configured to generate the stain compensating data by calculating the image data and one selected from the first stain compensating value, the second stain compensating value, and the third stain compensating value.

According to example embodiments, a display device may include a display panel configured to display an image based on an image data, an image analyzer configured to determine whether the image data includes a set pattern, and to output a charging ratio of the image data as an image analyzing signal when the image data includes the set pattern, a stain compensator configured to output a stain compensating data that compensates a stain of the image data based on the image analyzing signal and the image data, and a data driver configured to generate a data voltage provided to a pixel based on the stain compensating data. The stain compensator may store a first stain compensating value and a second stain compensating value, and generates the stain compensating data by selecting one from the first stain compensating value, the second stain compensating value, and a third stain compensating value generated by interpolating the first stain compensating value and the second stain compensating value based on a driving mode.

In example embodiments, the pixel may include a red sub-pixel, a green sub-pixel, and a blue sub-pixel.

In example embodiments, the first stain compensating value may compensate the image data having a minimum charging ratio, and the second stain compensating value may compensate the image data having a maximum charging ratio.

In example embodiments, the stain compensator may generate the stain compensating data by selecting the first stain compensating value when the image analyzing signal includes the minimum charging ratio, the stain compensator may generate the stain compensating data by selecting the second stain compensating value when the image analyzing signal includes the maximum charging ratio, and the stain compensator may generate the stain compensating data by selecting a third stain compensating value generated by interpolating the first stain compensating value and the second stain compensating value when the image analyzing signal includes a charging ratio between the minimum charging ratio and the maximum charging ratio.

In example embodiments, the stain compensator may include a first memory configured to store the first stain compensating value, a second memory configured to store the second stain compensating value, a first calculator configured to calculate the third stain compensating value by interpolating the first stain compensating value and the second stain compensating value, and a second calculator configured to generate the stain compensating data by calculating the image data and one selected from the first stain calculating value, the second stain calculating value and the third stain calculating value.

According to example embodiments, a display device may include a display panel configured to display an image based on an image data, a stain compensator configured to output a stain compensating data that compensates a stain of the image data, and a data driver configured to generate a data voltage based on the stain compensating data. The stain compensator may store at least two stain compensating values, and generates the stain compensating data based on the stain compensating values.

In example embodiments, the stain compensator may store a first stain compensating value and a second stain compensating value, and generate the stain compensating data by selecting one from the first stain compensating value, the second stain compensating value, and a third stain compensating value generated by interpolating the first stain compensating value and the second stain compensating value based on a driving mode of the display panel.

In example embodiments, the display panel may include a first pixel and a second pixel. The display panel may not be driven by a spatial division pixel driving method in a first driving mode and may be driven by a spatial division pixel driving method in a second driving mode and a third driving mode. A difference of a data voltage provided to the first pixel and a second data voltage provided to the second pixel in the second driving mode is greater than a difference of the first data voltage and the second data voltage in the third driving mode.

In example embodiments, the stain compensator may select the first stain compensating value in the first driving mode, select the second stain compensating value in the second driving mode, and select the third stain compensating value in the third driving mode.

In example embodiments, the stain compensator may store the a first stain compensating value and a second stain compensating value, and generate the stain compensating data by selecting one from the first stain compensating value, the second compensating value, and a third stain compensating value that interpolates the first stain compensating value and the second stain compensating value.

In example embodiments, the first stain compensating value may compensate the image data having a minimum charging ratio, and the second stain compensating value may compensate the image data having a maximum charging ratio.

In example embodiments, the stain compensator may generate the stain compensating data by selecting the first stain compensating value when an image analyzing signal that represents a charging ratio of the image data includes the minimum charging ratio. The stain compensator may generate the stain compensating data by selecting the second stain compensating value when the image analyzing signal includes the maximum charging ratio. The stain compensator may generate the stain compensating data by selecting the third stain compensating value generated by interpolating the first stain compensating value and the second stain compensating value when the image analyzing signal includes a charging ratio between the minimum charging ratio and the maximum charging ratio.

Therefore, the display device according to example embodiments may include the first pixel and the second pixel and provide the first data voltage and the second data voltage of which voltage levels are the same or different to the first pixel and the second pixel according to the driving mode of the display device so that a side viewing angle of the display device may improve. Here, the stain of the display panel may improve by changing the stain compensating value of the image data according to the driving mode. The display device according to example embodiments may change the stain compensating value of the image data according to the charging ratio of the image data so that the stain of the display panel may improve. Thus, display quality of the display device may improve.

BRIEF DESCRIPTION OF THE DRAWINGS

Illustrative, non-limiting example embodiments will be more clearly understood from the following detailed description taken in conjunction with the accompanying drawings.

FIGS. 5A-5B are diagrams illustrating an operation of the stain compensator of FIG. 4.

DETAILED DESCRIPTION

Hereinafter, the present inventive concept will be explained in more detail with reference to the accompanying drawings.

Figure 1:
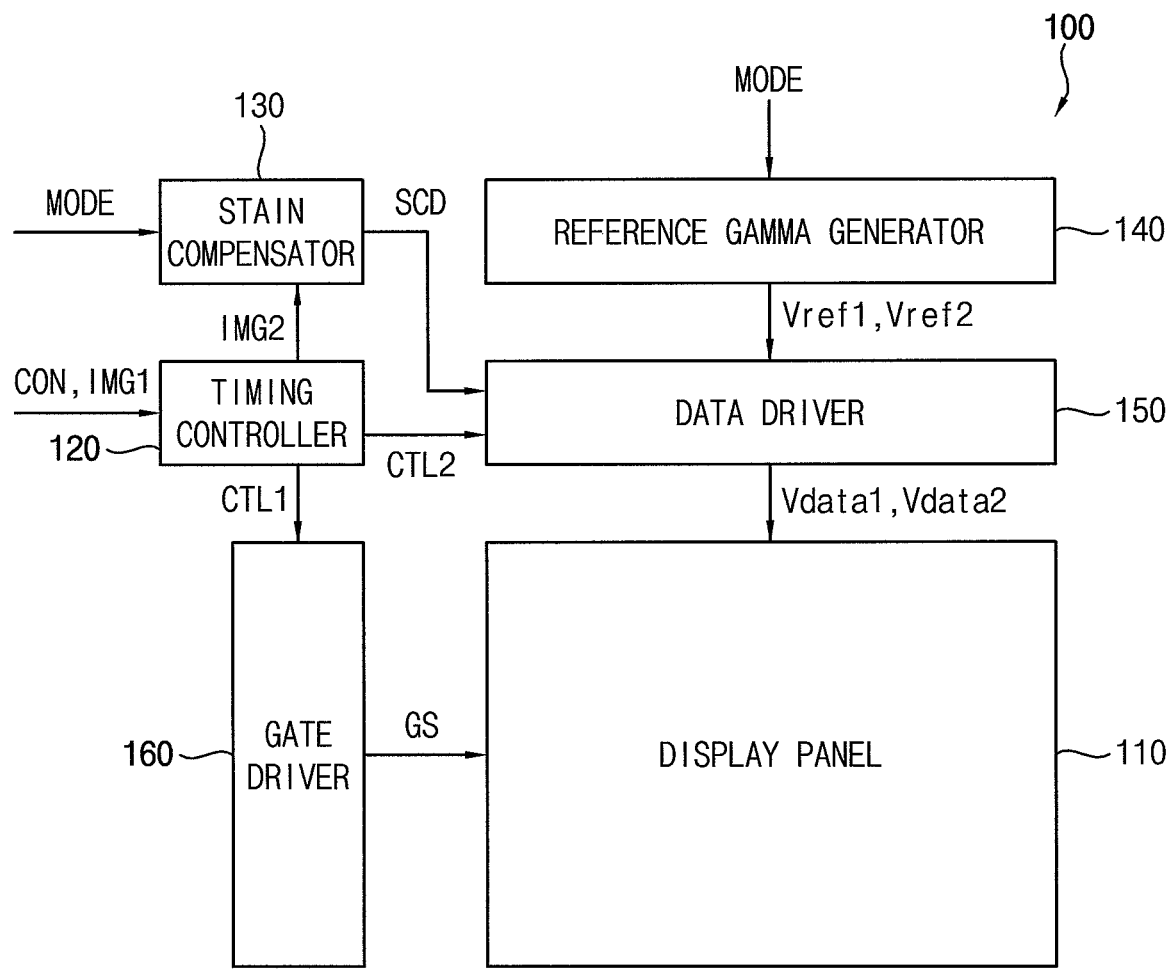
FIG. 1 is a block diagram illustrating a display device according to example embodiments.
Figure 2:
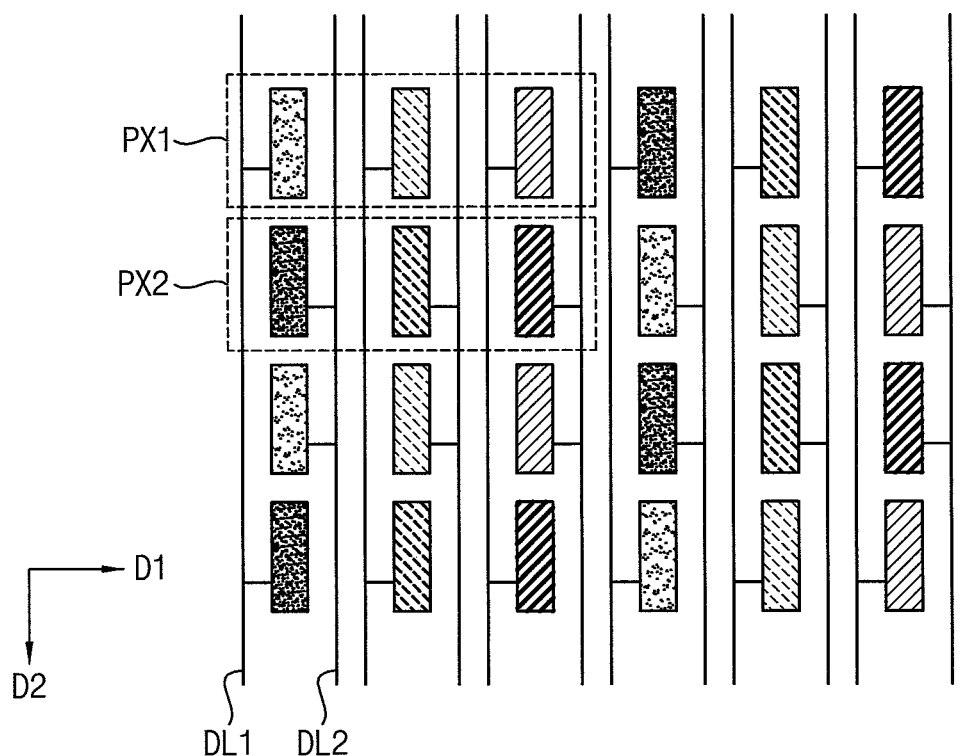
FIG. 2 is a diagram illustrating a display panel included in the display device of FIG. 1.
Figure 2:
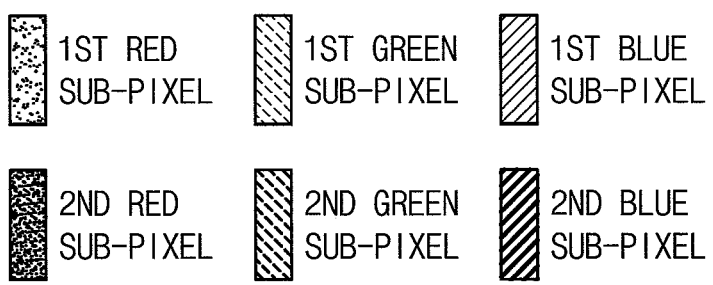
Figure 3:
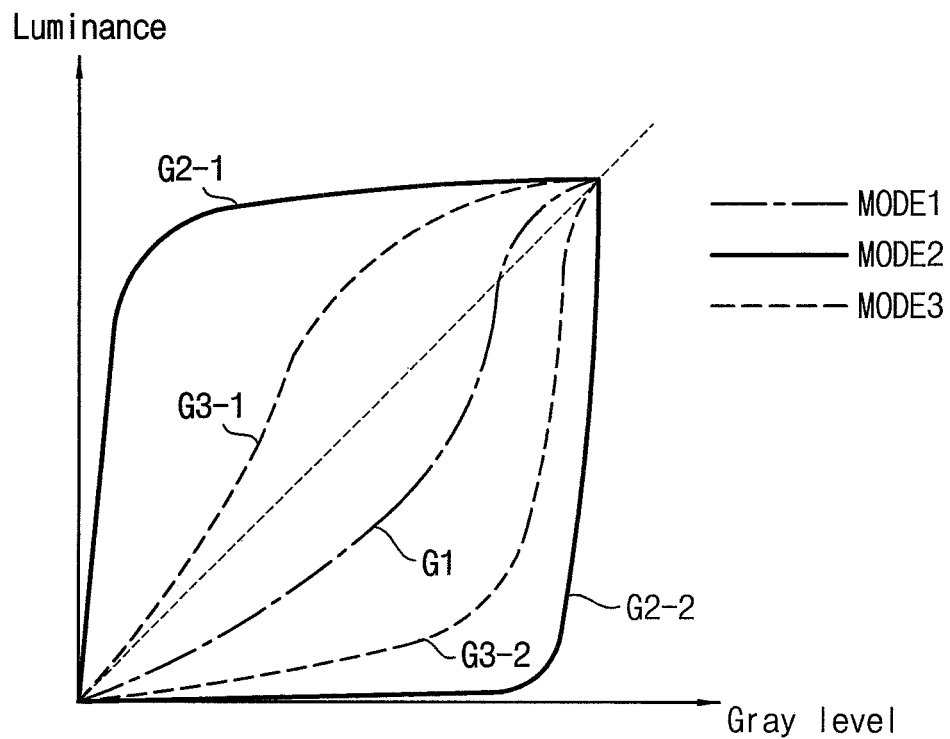
FIG. 3 is a graph illustrating an operation of the display panel of FIG. 2.

FIG. 1 is a block diagram illustrating a display device according to example embodiments. FIG. 2 is a diagram illustrating a display panel included in the display device of FIG. 1. FIG. 3 is a graph illustrating an operation of the display panel of FIG. 2.

Referring to FIG. 1, a display device 100 may include a display panel 110, a timing controller 120, a stain compensator 130, a reference gamma generator 140, a data driver 150, and a gate driver 160.

The display panel 110 may include a plurality of gate lines, a plurality of data lines, a plurality of pixels electrically coupled to the data lines and gate lines. The gate lines may extend in a first direction D1 and the data lines may extend in a second direction D2 perpendicular to or crossing the first direction D1. Each of the pixels may include a switching element, liquid crystal capacitor, and a storage capacitor electrically coupled to the switching element. The switching element may be a thin film transistor. The liquid crystal capacitor may include a first electrode coupled to a pixel electrode that may receive a data voltage and a second electrode coupled to a common electrode that may receive a common voltage. The storage capacitor may include a first electrode coupled to the pixel electrode that may receive a data voltage and a second electrode coupled to a storage electrode that may receive a storage voltage. The storage voltage may be the same as the common voltage.

Referring to FIG. 2, the display panel 110 may include a first pixel PX1 and a second pixel PX2. For example, the first pixel PX1 may include a first red sub-pixel, a first green sub-pixel, and a first blue sub-pixel. For example, the second pixel PX2 may include a second red sub-pixel, a second green sub-pixel, and a second blue sub-pixel. The first pixel PX1 and the second pixel PX2 may be alternately formed with each other in the first direction D1 and in the second direction D2. The display panel 110 may include a first data line DL1 and a second data line DL2. The first red sub-pixel, the first green sub-pixel, and the first blue sub-pixel of the first pixel PX1 may be coupled to the first data line DL1 or the second data line DL2. The second red sub-pixel, the second green sub-pixel, and the second blue sub-pixel of the second pixel PX2 may be coupled to the first data line DL1 or the second data line DL2. A first data voltage Vdata1 may be provided to the first pixel PX1 and the second data voltage Vdata2 may be provided to the second pixel PX2. In some embodiments, the first data voltage Vdata1 may be provided to the second pixel PX2 and the second data voltage Vdata2 may be provided to the first pixel PX1.

The display device 100 may be driven in a first driving mode MODE1, a second driving mode MODE2, and a third driving mode MODE3. The display device 100 may not be driven by a spatial division pixel (SDP) driving method in the first driving mode MODE1 in which a normal image is displayed. The display device 100 may be driven by the SDP driving method in the second driving mode MODE2 and the third driving mode MODE3 in which an image having high display quality is displayed. For example, the display device 100 may be driven in the first driving mode MODE1 when the display device 100 displays an image such as a wait screen, a document, an internet browser, etc. For example, the display device 100 may be driven in the second driving mode MODE2 when the display device 100 displays an image having a high display quality such as a movie, a game, etc. For example, the display device 100 may be driven in the third driving mode MODE3 when the display device 100 displays an image such as a broadcasting image, etc. The driving mode of the display device 100 may be selected by an user or operation of the display device 100.

When the display device 100 is driven in the first driving mode MODE1, the first pixel PX1 and the second pixel PX2 may display an image based on the first data voltage Vdata1 and the second data voltage Vdata2 of which voltage level is the same for the same grayscale value (gray level). The first pixel PX1 and the second pixel PX2 may receive the first data voltage Vdata1 and the second data voltage Vdata2 according to the same gamma curve in the first driving mode MODE1. When the display device 100 is driven in the second driving mode MODE2, the first pixel PX1 and the second pixel PX2 may display an image based on the first data voltage Vdata1 and the second data voltage Vdata2 according to different gamma curves. Referring to FIG. 3, the first data voltage Vdata1 and the second data voltage Vdata2 may be generated using a first gamma curve G1 in the first driving mode MODE1. The first data voltage Vdata1 and the second data voltage Vdata2 may be generated using second gamma curves G2-1, G2-2 in the second driving mode MODE2. The first data voltage Vdata1 and the second data voltage Vdata2 may be generated using third gamma curves G3-1, G3-2 in the third driving mode MODE3. The first pixel PX1 and the second pixel PX2 may receive the first data voltage Vdata1 and the second data voltage Vdata2, respectively, according to the different second gamma curves G2-1, G2-2 in the second driving mode MODE2 and may receive the first data voltage Vdata1 and the second data voltage Vdata2 according to the different third gamma curves G3-1, G3-2 in the third driving mode MODE3. For example, the first pixel PX1 may display an image having higher luminance than an image displayed on the second pixel PX2 for the same grayscale value. According to the second gamma curves G2-1, G2-2 and the third gamma curves G3-1, G3-2 as described in FIG. 3, a difference of the first data voltage Vdata1 and the second data voltage Vdata2 in the second driving mode MODE2 is greater than the first data voltage Vdata1 and the second data voltage Vdata2 in the third driving mode MODE3 for the same grayscale value. That is, the difference of the first data voltage Vdata1 and the second data voltage Vdata for each of the grayscales values may have a maximum value in the second driving mode MODE2. As described above, a side viewing angle may improve by providing the first data voltage Vdata1 and the second data voltage Vdata2 having different voltage levels to the first pixel PX1 and the second pixel PX2 in the second driving mode MODE2 and the third driving mode MODE3.

The timing controller 120 may receive a first image data IMG1 and an input control signal CON from an external device. For example, the first image data IMG1 may include a red image data, a green image data, and a blue image data. The first image data IMG may include a magenta image data, a yellow image data, and a cyan image data. The input control signal CON may include a clock signal, an enable signal, a vertical synchronization signal, a horizontal synchronization signal, etc. The timing controller 120 may generate a second image data IMG2 based on the first image data IMG1. For example, the timing controller 120 may convert the first image data IMG1 to the second image data IMG2 by adjusting an algorithm that compensates the display quality of the first image data IMG1. The timing controller 120 may output the second image data IMG2 to the stain compensator 130.

The timing controller 120 may generate a first control signal CTL1 and the second control signal CTL2 that control the gate driver 160 and the data driver 150, respectively, based on the first image data IMG1 and the input control signal CON. The timing controller 120 may generate the first control signal CTL1 for controlling an operation of the gate driver based on the input control signal CON. The timing controller 120 may output the first control signal CTL1 to the gate driver 160. For example, the first control signal CTL1 may include a vertical start signal and a gate clock signal. The timing controller 120 may generate the second control signal CTL2 for controlling an operation of the data driver 150 based on the input control signal CON. The timing controller 120 may output the second control signal CTL2 to the data driver 150. For example, the second control signal CTL2 may include a horizontal start signal and a load signal.

The stain compensator 130 may output a stain compensating data SCD that compensates a stain of the second image data IMG2 based on a driving mode MODE provided from the external device and the second image data IMG2 provided from the timing controller 120. The stain compensator 130 may store a first stain compensating value and a second stain compensating value based on a manufacturing process of the display device 100. The first stain compensating value may be a data that compensates the stain displayed on the display panel 110 when the display device 100 is driven in the first driving mode MODE1. The first data voltage Vdata1 and the second data voltage Vdata2 based on the same gamma curve (i.e., the first gamma curve G1) may be provided to the first pixel PX1 and the second pixel PX2, respectively. The second stain compensating value may be a data that compensates the stain displayed on the display panel 110 when the display device 100 is driven in the second driving mode MODE2. The first data voltage Vdata1 and the second data voltage Vdata2 based on the different gamma curves (i.e., the second gamma curves G2-1, G2-2) may be provided to the first pixel PX1 and the second pixel PX2, respectively. The difference between the first data voltage Vdata1 and the second data voltage Vdata2 may have maximum value in the second driving mode MODE2. The stain compensator 130 may select the first stain compensating value and generate the stain compensating data SCD by calculating the second image data IMG2 and the first stain compensating value in the first driving mode MODE1. The stain compensator 130 may select the second stain compensating value and generate the stain compensating data SCD by calculating the second image data IMG2 and the second stain compensating value in the second driving mode MODE2. The stain compensator 130 may generate a third stain compensating value by interpolating the first stain compensating value and the second stain compensating value in the third driving mode MODE3. The difference between the first data voltage Vdata1 and the second data voltage Vdata2 in the third driving mode MODE3 may be greater than the difference between the first data voltage Vdata1 and the second data voltage Vdata2 in the first driving mode MODE1. The difference between the first data voltage Vdata1 and the second data voltage Vdata2 in the third driving mode MODE3 may be less than the difference between the first data voltage Vdata1 and the second data voltage Vdata2 in the second driving mode MODE2. Thus, the third stain compensating value to compensate the stain on the display panel 110 in the third driving mode MODE3 may be calculated by interpolating the first stain compensating value and the second stain compensating value. The stain compensator 130 may calculate the third stain compensating value and generate the stain compensating data SCD by calculating the second image data IMG2 and the third stain compensating value.

The reference gamma generator 140 may generate a first reference gamma voltage Vref1 and a second reference gamma voltage Vref2 based on the driving mode MODE provided from the external device. The reference gamma generator 140 may generate the first reference gamma voltage Vref1 and the second reference gamma voltage Vref2 of which voltage levels are the same in the first driving mode MODE1. The reference gamma generator 140 may generate the first reference gamma voltage Vref1 and the second reference gamma voltage Vref2 of which voltage levels are different in the second driving mode MODE2 and the third driving mode MODE3. Here, a difference between the first reference gamma voltage Vref1 and the second reference gamma voltage Vref2 in the second driving mode MODE2 is greater than the difference between first reference gamma voltage Vref1 and the second reference gamma voltage Vref2 in the third driving mode MODE3 for the same grayscale value. The reference gamma generator 140 may be coupled to the data driver 150 or be in the data driver 150.

The data driver 150 may generate a first gamma voltage and a second gamma voltage based on the second control signal CTL2 provided from the timing controller 120, the stain compensating data SCD provided from the stain compensator 130, and the first reference gamma voltage Vref1 and the second reference gamma voltage Vref2 provided from the reference gamma generator 140. For example, the data driver may include a string resistor circuit that divides a power voltage and a ground voltage to the first gamma reference voltages Vref1 and the second gamma reference voltages Vref2.

The data driver 150 may generate the first gamma voltage and the second gamma voltage corresponding to the first gamma curve G1 based on the first reference gamma voltage Vref1 and the second reference gamma voltage Vref2 in the first driving mode MODE1. The data driver 150 may generate the first gamma voltage and the second gamma voltage corresponding to the second gamma curves G2-1, G2-2 based on the first reference gamma voltage Vref1 and the second reference gamma voltage Vref2 in the second driving mode MODE2. The data driver 150 may generate the first gamma voltage and the second gamma voltage corresponding to the third gamma curves G3-1, G3-2 based on the first reference gamma voltage Vref1 and the second reference gamma voltage Vref2 in the third driving mode MODE3. The data driver 150 may convert the stain compensating data SCD provided from the stain compensator 130 to the first data voltage Vdata1 that is an analog data using the first gamma voltage. The data driver 150 may convert the stain compensating data SCD provided from the stain compensator 130 to the second data voltage Vdata2 that is the analog data using the second gamma voltage. The data driver 150 may output the first data voltages Vdata1 and the second data voltages Vdata2 to the first data lines DL1 and the second data lines DL2.

The data driver 150 may include a shift register, a latch, a signal processor, and/or a buffer. The shift register may output a latch pulse to the latch. The latch may temporarily store the second image data IMG2 and output the second image data IMG2 to the signal processor. The signal processor may generate the first and second data voltages Vdata1 and Vdata2 based on the stain compensating data SCD that is a digital data and the first and second gamma voltages. The signal processor may output the first and the second data voltages Vdata1, Vdata2 to the buffer. The buffer may output the first and second data voltage Vdata1, Vdata2 to the first and second data lines DL1, DL2. The data driver 150 may be mounted on the display panel 110 (Chip on Glass; COG). The data driver 150 may be mounted on a film (Chip on Film; COF) and be coupled to the display panel 110 through the film. The data driver 150 may be directly formed in the display panel 110.

The gate driver 160 may generate gate signals GS in response to the first control signal CTL1 provided from the timing controller 120. The gate driver 160 may provide the gate signals GS to the gate lines. The gate driver 160 may be mounted on the display panel 110. The gate driver 160 may be mounted on the film and be coupled to the display panel 110 through the film. The gate driver 160 may be directly formed in the display panel 110.

As described above, the display device 100 of FIG. 1 may include the first pixel PX1 and the second pixel PX2 and provide the first data voltage Vdata1 and the second data voltage Vdata2 of which the voltage levels are the same or different based on the driving mode MODE of the display device 100 so that the side viewing angle may improve. Here, the stain of the display panel 110 may be compensated for by changing the stain compensating value of the image data according to the driving mode MODE of the display device 100. Thus, the display quality of the display device 100 may improve.

Figure 4:
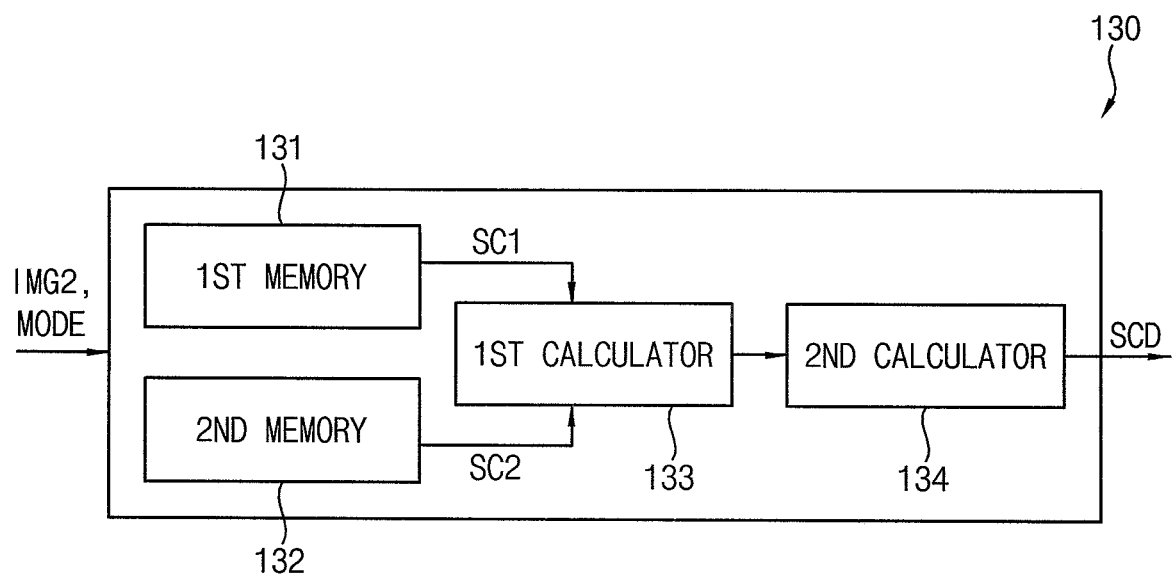
FIG. 4 is block diagram illustrating a stain compensator included in the display device of FIG. 1.
Figure 5A:
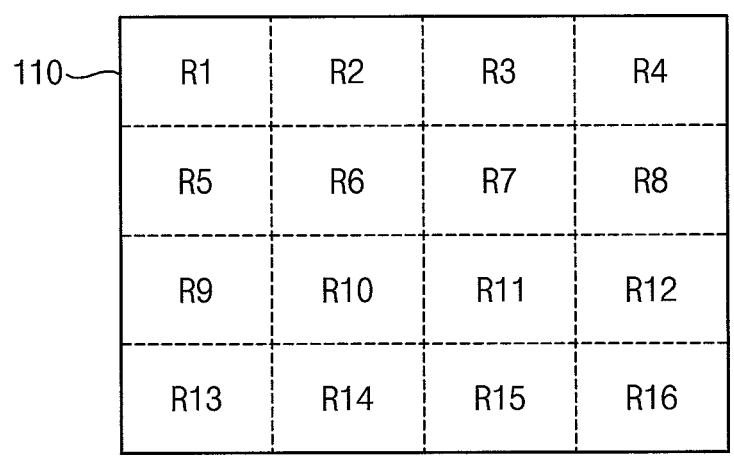

FIG. 4 is block diagram illustrating a stain compensator included in the display device of FIG. 1. FIGS. 5A-5B are diagrams illustrating an operation of the stain compensator of FIG. 4.

Referring to FIG. 4, the stain compensator 130 may include a first memory 131, a second memory 132, a first calculator 133, and a second calculator 134. The stain compensator 130 may output the stain compensating data SCD that compensates the stain of the second image data IMG2 based on the driving mode MODE.

Each stain may be displayed different from each other according to a region of the display panel 110. Referring to FIG. 5A, the stain compensator 130 may divide the display panel 110 into a plurality of regions R1 through R16 and store the stain compensating values of each of the regions. Although the stain compensator 130 that divides the display panel 110 into the plurality of regions R1 through R16 is described in FIG. 5A, an operation of the stain compensator 130 is not limited thereto. For example, the stain compensator 130 may store the stain compensating values of each of the data lines formed in the display panel 110.

Referring to FIG. 5B, the first memory 131 may store the first stain compensating value SC1 that compensates the stain displayed on the display panel 110 while the display device 100 is driven in the first driving mode MODE1. The first stain compensating value SC1 may be stored in the first memory 131 during the manufacturing process of the display device 100. For example, the first memory 131 may be implemented as a lookup table (LUT) that stores the first stain compensating values SC1_1 through SC1_16 corresponding to each of the regions. For example, each of the first stain compensating values SC1_1 through SC1_16 may be a grayscale value (gray level) to control the grayscale value (gray level) of each of the regions. For example, each of the first stain compensating values SC1_1 through SC1_16 may be a coefficient to control the grayscale value of each of the regions.

Referring to FIG. 5B, the second memory 132 may store the second stain compensating value SC2 that compensates the stain displayed on the display panel 110 while the display device 100 is driven in the second driving mode MODE2. The second stain compensating value SC2 may be stored in the second memory 132 during the manufacturing process of the display device 100. For example, the second memory 132 may be implemented as a lookup table that stores the second stain compensating values SC2_1 through SC2_16 corresponding to each of the regions. The difference between the first data voltage Vdata1 and the second data voltage Vdata2 may have the maximum value in the second driving mode MODE2. For example, the second stain compensating values SC2_1 through SC2_16 may be a grayscale value to control the grayscale value of each of the regions. For example, each of the second stain compensating values SC2_1 through SC2_16 may be a coefficient to control the grayscale value of each of the regions.

The first calculator 133 may generate the third stain compensating values of each of the regions by interpolating the first stain compensating values SC1_1 through SC1_16 and the second stain compensating values SC2_1 through SC2_16. The first calculator 133 may select the first stain compensating values SC1_1 through SC1_16 stored in the first memory 131 and provide the first stain compensating values SC1_1 through SC1_16 to the second calculator 134 when the display device 100 is driven in the first driving mode MODE1. The first calculator 133 may select the second stain compensating values SC2_1 through SC2_16 stored in the second memory 132 and provide the second stain compensating values SC2_1 through SC2_16 to the second calculator 134 when the display device is driven in the second driving mode MODE2. The first calculator 133 may generate the third stain compensating value by interpolating the first stain compensating values SC1_1 through SC1_16 stored in the first memory 131 and the second stain compensating values SC2_1 through SC2_16 stored in the second memory 132 when the display device is driven in the third driving mode MODE3. For example, the first calculator 133 may generate the third stain compensating value based on the difference between the first data voltage Vdata1 and the second data voltage Vdata2 for the same grayscale value. For example, when the difference between the first data voltage Vdata1 and the second data voltage Vdata2 is 4V about 126 grayscale value in the second driving mode MODE2 and the difference between the first data voltage Vdata1 and the second data voltage Vdata2 is 2V about 126 grayscale value in the third driving mode MODE3, the first calculator 133 may generate median values of the first stain compensating values SC1_1 through SC1_16 and the second stain compensating values SC2_1 through SC2_16 as the third stain compensating values.

The second calculator 134 may calculate the second image data IMG2 provided from the timing controller 120, the driving mode MODE provided from the external device, and one of the first stain compensating values SC1_1 through SC1_16, the second stain compensating values SC2_1 through SC2_16, and the third stain compensating values from the first calculator 133 and generate the stain compensating data SCD. The second calculator 134 may generate the stain compensating data SCD based on the first stain compensating values SC1_1 through SC1_16 provided from the first calculator 133 and the second image data IMG2 when the display device 100 is driven in the first driving mode MODE1. The second calculator 134 may generate the stain compensating data SCD based on the second stain compensating values SC2_1 through SC2_16 provided from the first calculator 133 and the second image data IMG2 when the display device 100 is driven in the second driving mode MODE2. The second calculator may generate the stain compensating data SCD based on the third stain compensating values provided from the first calculator 133 and the second image data IMG2 when the display device 100 is driven in the third driving mode MODE3. For example, when the first stain compensating values SC1_1 through SC1_16, the second stain compensating values SC2_1 through SC2_16, and the third stain compensating values are grayscale values (gray levels), the second calculator 134 may generate the stain compensating data SCD by adding one of the first stain compensating values SC1_1 through SC1_16, the second stain compensating values SC2_1 through SC2_16, and the third stain compensating values to the grayscale values (gray levels) of the second image data IMG2. For example, when the first stain compensating values SC1_1 through SC1_16, the second stain compensating values SC2_1 through SC2_16, and the third stain compensating values are coefficients, the second calculator 134 may generate the stain compensating data SCD by multiplying one of the first stain compensating values SC1_1 through SC1_16, the second stain compensating values SC2_1 through SC2_16, and the third stain compensating values by the grayscale values of the second image data IMG2.

Figure 6:
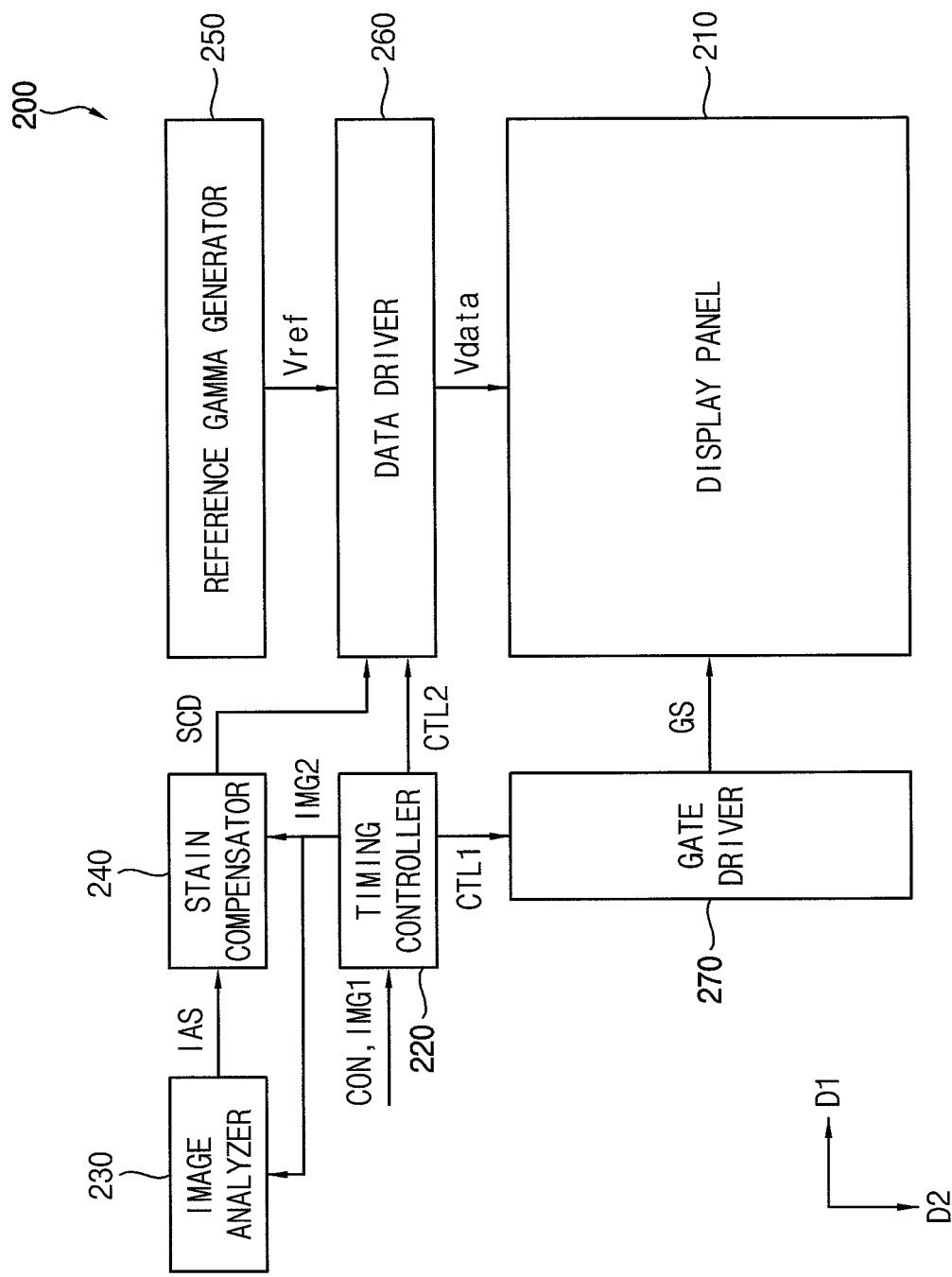
FIG. 6 is a block diagram illustrating a display device according to example embodiments.
Figure 7:
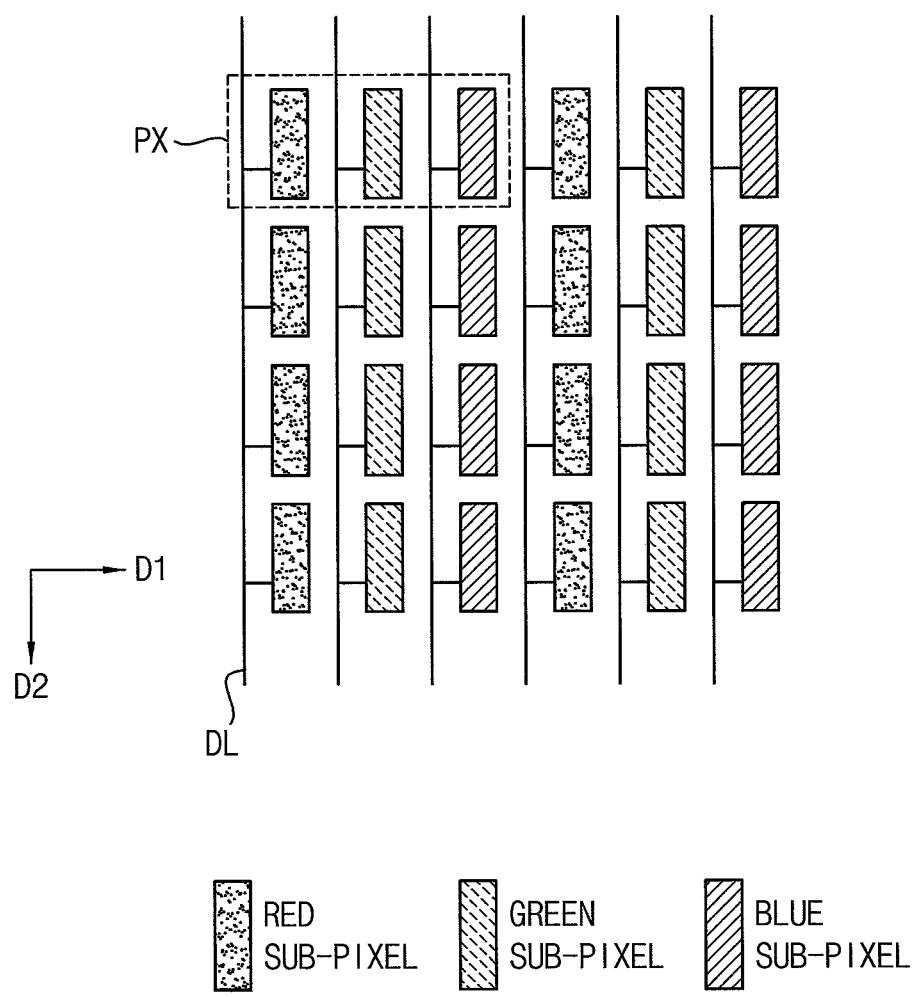
FIG. 7 is a diagram illustrating a display panel included in the display device of FIG. 6.

FIG. 6 is a block diagram illustrating a display device according to example embodiments. FIG. 7 is a diagram illustrating a display panel included in the display device of FIG. 6.

Referring to FIG. 6, a display device 200 may include a display panel 210, a timing controller 220, an image analyzer 230, a stain compensator 240, a reference gamma generator 250, a data driver 260, and a gate driver 270.

The display panel 210 may display an image based on an image data. The display panel 210 may include a plurality of gate lines, a plurality of data lines, a plurality of pixels electrically coupled to the data lines and the gate lines. The gate lines may extend in a first direction D1 and the data lines may extend in a second direction D2 perpendicular to or crossing the first direction D1. Each of the pixels may include a switching element, liquid crystal capacitor, and a storage capacitor electrically coupled to the switching element. The switching element may be a thin film transistor. The liquid crystal capacitor may include a first electrode coupled to a pixel electrode and receives the data voltage and a second electrode coupled to a common electrode and receives a common voltage. The storage capacitor may include a first electrode coupled to the pixel electrode and receives the data voltage and a second electrode coupled to a storage electrode and receives a storage voltage. The storage voltage may be the same with the common voltage.

Referring to FIG. 7, the display panel 210 may include a plurality of pixels PX. For example, each of the pixels PX may include a red sub-pixel, a green sub-pixel, and a blue sub-pixel. Alternatively, each of the pixels PX may include a magenta sub-pixel, a cyan sub-pixel, and a yellow sub-pixel. Each of the red sub-pixel, the green sub-pixel, and the blue sub-pixel may be coupled to the data lines DL. A data voltage Vdata may be provided to each of the red sub-pixel, the green sub-pixel, and the blue sub-pixel through the data line DL. The plurality of pixels PX may be formed in the first direction D1 and the second direction D2.

The timing controller 220 may receive a first image data IMG1 and an input control signal CON from an external device. For example, the first image data IMG1 may include a red image data, a green image data, and a blue image data. The first image data IMG may include a magenta image data, a yellow image data, and a cyan image data. The input control signal CON may include a clock signal, an enable signal, a vertical synchronization signal, a horizontal synchronization signal, etc. The timing controller 220 may generate a second image data IMG2 based on the first image data IMG1. For example, the timing controller 220 may convert the first image data IMG1 to the second image data IMG2 by adjusting an algorithm that compensates the display quality of the first image data IMG1. The timing controller 220 may output the second image data IMG2 to the stain compensator 240.

The timing controller 220 may generate a first control signal CTL1 and a second control signal CTL2 that control the gate driver 270 and the data driver 260 based on the first image data IMG1 and the input control signal CON. The timing controller 220 may generate the first control signal CTL1 for controlling an operation of the gate driver based on the input control signal CON. The timing controller 220 may output the first control signal CTL1 to the gate driver 270. For example, the first control signal CTL1 may include a vertical start signal and a gate clock signal. The timing controller 220 may generate the second control signal CTL2 for controlling an operation of the data driver 260 based on the input control signal CON. The timing controller 220 may output the second control signal CTL2 to the data driver 260. For example, the second control signal CTL2 may include a horizontal start signal and a load signal.

The image analyzer 230 may determine whether the second image data IMG2 includes a set or predetermined pattern, and output a charging ratio of the second image data IMG2 as an image analyzing signal IAS when the second image data IMG1 includes the set or predetermined pattern. The image analyzer 230 may receive the second image data IMG2 from the timing controller 220. The image analyzer 230 may determine whether the second image data IMG2 includes the set or predetermined pattern. The image analyzer 230 may store the set or predetermined pattern and the charging ratio corresponding to the set or predetermined pattern. When the second image data IMG2 includes the set or predetermined pattern, enough amounts of charges may not be charged in the pixel PX because of load of the pattern. The set or predetermined pattern and the charging ratio of the second image data IMG2 that includes the set or predetermined pattern may be experimentally determined. The set or predetermined pattern and the charging ratio of the second image data IMG may be stored in the manufacturing process of the display device 200. The image analyzer 230 may output the charging ratio of the second image data IMG2 that includes the set or predetermined pattern as the image analyzing signal IAS when the second image data IMG2 includes the set or predetermined pattern.

The stain compensator 240 may output the stain compensating data SCD that compensates the stain of the second image data based on the image analyzing signal IAS provided from the image analyzer 230 and the second image data IMG2 provided from the timing controller 220. The stain compensator 240 may store a first stain compensating value and a second stain compensating value in the manufacturing process of the display device 200. The first stain compensating value may be a data that compensates the second image data IMG2 that includes the pattern having a minimum charging ratio among the patterns stored in the image analyzer 230. The second stain compensating value may be a data that compensates the second image data that includes the pattern having a maximum charging ratio among the patterns stored in the image analyzer 230. When the image analyzing signal IAS includes the minimum charging ratio, the stain compensator 240 may select the first stain compensating value and generate the stain compensating data SCD. When the image analyzing signal IAS includes the maximum charging ratio, the stain compensator 240 may select the second stain compensating value and generate the stain compensating data SCD. When the image analyzing signal IAS includes a charging ratio between the minimum charging ratio and the maximum charging ratio, the stain compensator 240 may select a third stain compensating value generated by interpolating the first stain compensating value and the second stain compensating value and generate the stain compensating data SCD.

The reference gamma generator 250 may generate a reference gamma voltage Vref based on a control signal provided from the timing controller 220. The reference gamma generator 250 may provide the reference gamma voltage Vref to the data driver 260. For example, the reference gamma generator 250 may be coupled to the data driver 260 or be in the data driver 260.

The data driver 260 may generate a gamma voltage based on the second control signal CTL2 provided from the timing controller 220, a stain compensating data SCD provided from the stain compensator 240, and the reference gamma voltage Vref provided from the reference gamma generator 250. For example, the data driver 260 may include a string resistor circuit that divides a power voltage and a ground voltage to the gamma reference voltages. The data driver 260 may convert the stain compensating data SCD provided from the stain compensator 240 to the data voltage that is an analog data using the gamma voltage. The data driver 260 may provide the data voltage Vdata to the data lines DL of the display panel 210.

The data driver 260 may include a shift register, a latch, a signal processor, and/or a buffer. The shift register may output a latch pulse to the latch. The latch may temporarily store the second image data IMG2 and output the second image data IMG2 to the signal processor. The signal processor may generate the data voltages Vdata that is the analog data based on the second image data IMG2 that is a digital data and the gamma voltages. The signal processor may output the data voltages Vdata to the buffer. The buffer may output the data voltage Vdata to the data lines DL. The data driver 260 may be mounted on the display panel 210 (Chip on Glass; COG). The data driver 260 may be mounted on a film (Chip on Film; COF) and be coupled to the display panel 210 through the film. The data driver 260 may be directly formed in the display panel 110.

The gate driver 270 may generate gate signals GS in response to the first control signal CTL1 provided from the timing controller 220. The gate driver 270 may provide the gate signals GS to the gate lines. The gate driver 270 may be mounted on the display panel 210. The gate driver 270 may be mounted on the film and be coupled to the display panel 210 through the film. The gate driver 160 may be directly formed in the display panel 110.

As described above, the display device 200 of FIG. 6 may change the stain compensating value of the image data according to the charging ratio of the image data so that the stain of the display panel 210 may be compensated for. Thus, the display quality may improve.

Figure 8:
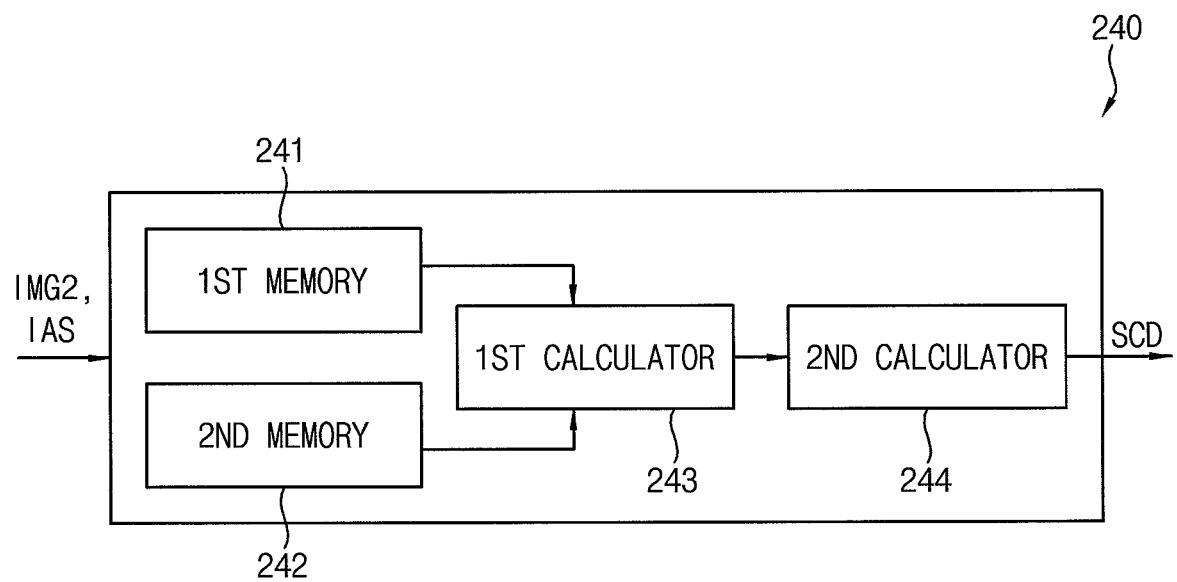
FIG. 8 is a diagram illustrating a stain compensator included in the display device of FIG. 6.
Figure 9A:
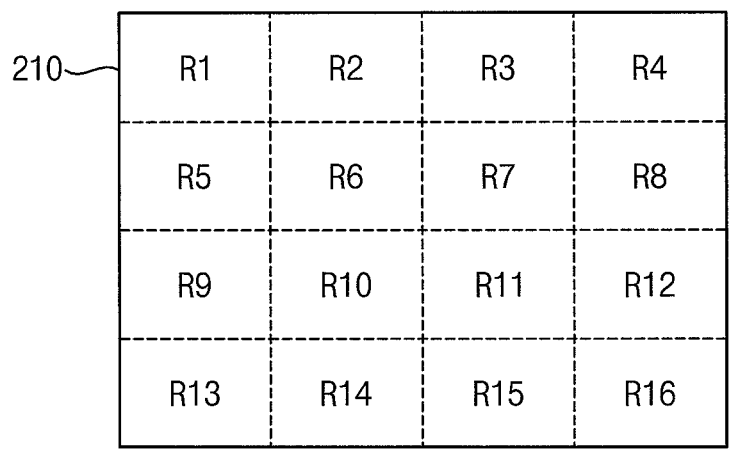
FIGS. 9A-9B are diagrams illustrating an operation of the stain compensator of FIG. 8.
Figure 9B:
Figure 9B:

FIG. 8 is a diagram illustrating a stain compensator included in the display device of FIG. 6. FIGS. 9A-9B are diagrams illustrating an operation of the stain compensator of FIG. 8.

Referring to FIG. 8, the stain compensator 240 may include a first memory 241, a second memory 242, a first calculator 243, and a second calculator 244. The stain compensator 240 may output the stain compensating data SCD that compensates the stain of the second image data IMG2 based on the image analyzing signal IAS.

The stain may be displayed different from each other according to a region of the display panel 210. Referring to FIG. 9A, the stain compensator 240 may divide the display panel 210 into a plurality of regions R1 through R16 and store the stain compensating values of each of the regions. Although the stain compensator 240 that divides the display panel 210 into the plurality of regions R1 through R16 is described in FIG. 9A, an operation of the stain compensator 240 is not limited thereto. For example, the stain compensator 240 may store the stain compensating values of each of the data lines formed in the display panel 210.

Referring to FIG. 9B, the first memory 241 may store the first stain compensating value SC1 that compensates the stain displayed on the display panel 210 while the second image data IMG2 that includes the pattern having the maximum charging ratio is displayed on the display panel 210. The first stain compensating value SC1 may be stored in the first memory 241 during the manufacturing process of the display device 200. For example, the first memory 241 may be implemented as a lookup table (LUT) that stores the first stain compensating values $SC1\_1$ through $SC1\_16$ corresponding to each of the regions. For example, each of the first stain compensating values $SC1\_1$ through $SC1\_16$ may be a grayscale value (gray level) to control the grayscale value (gray level) of each of the regions. For example, each of the first stain compensating values $SC1\_1$ through $SC1\_16$ may be a coefficient to control the grayscale value of each of the regions. For example, each of the first stain compensating values $SC1\_1$ through $SC1\_16$ may be an over driving voltage value to compensate the charging ratio of each of the regions. For example, each of the first stain compensating values $SC1\_1$ through $SC1\_16$ may be a pre-tilt voltage value to compensate the charging ratio of each of the regions.

Referring to FIG. 9B, the second memory 242 may store the second stain compensating value SC2 that compensates the stain displayed on the display panel 210 while the second image data IMG2 that includes the pattern having the minimum charging ratio is displayed on the display panel 210. The second stain compensating value SC2 may be stored in the second memory 242 during the manufacturing process of the display device 200. For example, the second memory 242 may be implemented as the lookup table that stores the second stain compensating values $SC2\_1$ through $SC2\_16$ corresponding to each of the regions. For example, each of the second stain compensating values $SC2\_1$ through $SC2\_16$ may be a grayscale value to control the grayscale value of each of the regions. For example, each of the second stain compensating values $SC2\_1$ through $SC2\_16$ may be a coefficient to control the grayscale value of each of the regions. For example, each of the second stain compensating values $SC2\_1$ through $SC2\_16$ may be an over driving voltage value to compensate the charging ratio of each of the regions. For example, each of the second stain compensating values $SC2\_1$ through $SC2\_16$ may be a pre-tilt voltage value to compensate the charging ratio of each of the regions.

The first calculator 243 may generate the third stain compensating values of each of the regions by interpolating the first stain compensating values $SC1\_1$ through $SC1\_16$ and the second stain compensating values $SC2\_1$ through $SC2\_16$. The first calculator 243 may select the first stain compensating values $SC1\_1$ through $SC1\_16$ stored in the first memory 241 and provide the first stain compensating values $SC1\_1$ through $SC1\_16$ to the second calculator 244 when the image analyzing signal IAS includes the minimum charging ratio. The first calculator 243 may select the second stain compensating values $SC2\_1$ through $SC2\_16$ stored in the second memory 242 and provide the second stain compensating values $SC2\_1$ through $SC2\_16$ to the second calculator 244 when the image analyzing signal IAS includes the maximum charging ratio. The first calculator 243 may generate the third stain compensating value by interpolating the first stain compensating values $SC1\_1$ through $SC1\_16$ stored in the first memory 241 and the second stain compensating values $SC2\_1$ through $SC2\_16$ stored in the second memory 242 when the image analyzing signal IAS includes a charging ratio between the minimum charging ratio and the maximum charging ratio. For example, when the image analyzing signal IAS includes the charging ratio between the minimum charging ratio and the maximum charging ratio, the first calculator 243 may generate intermediate values (e.g., median values) of the first stain compensating values SC1_1 through SC1_16 and the second stain compensating values SC2_1 through SC2_16 as the third stain compensating values.

The second calculator 244 may calculate the second image data IMG2 provided from the timing controller 220 and one of the first stain compensating values SC1_1 through SC1_16, the second stain compensating values SC2_1 through SC2_16, and the third stain compensating value and generate the stain compensating data SCD. The second calculator 244 may generate the stain compensating data SCD based on the first stain compensating values SC1_1 through SC1_16 provided from the first calculator 243 and the second image data IMG2 when the image analyzing signal IAS includes the minimum charging ratio. The second calculator 244 may generate the stain compensating data SCD based on the second stain compensating values SC2_1 through SC2_16 provided from the first calculator 243 and the second image data IMG2 when the image analyzing signal IAS includes the maximum charging ratio. The second calculator 244 may generate the stain compensating data SCD based on the third stain compensating values provided from the first calculator 243 and the second image data IMG2 when the image analyzing signal IAS includes the charging ratio between the minimum charging ratio and the maximum charging ratio. For example, when the first stain compensating values SC1_1 through SC1_16, the second stain compensating values SC2_1 through SC2_16, and the third stain compensating values are grayscale values (gray levels), the second calculator 244 may generate the stain compensating data SCD by adding one of the first stain compensating values SC1_1 through SC1_16, the second stain compensating values SC2_1 through SC2_16, and the third stain compensating values to the grayscale values (gray levels) of the second image data IMG2. For example, when the first stain compensating values SC1_1 through SC1_16, the second stain compensating values SC2_1 through SC2_16, and the third stain compensating values are coefficient, the second calculator 244 may generate the stain compensating data SCD by multiplying one of the first stain compensating values SC1_1 through SC1_16, the second stain compensating values SC2_1 through SC2_16, and the third stain compensating values by the grayscale values of the second image data IMG2. For example, when the first stain compensating values SC1_1 through SC1_16, the second stain compensating values SC2_1 through SC2_16, and the third stain compensating values are the over driving voltage value, the second calculator 244 may generate the stain compensating data SCD by adding a grayscale value corresponding to one of the first stain compensating values SC1_1 through SC1_16, the second stain compensating values SC2_1 through SC2_16, and the third stain compensating values to the grayscale values of the second image data IMG2.

The present inventive concept may be applied to a display device and an electronic device having the display device. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, the use of "may" when describing embodiments of the inventive concept refers to "one or more embodiments of the inventive concept."

It will be understood that when an element or layer is referred to as being "on", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly coupled to," or "immediately adjacent to" another element or layer, there are no intervening elements or layers present.

As used herein, the term "about" and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

The electronic or electric devices and/or any other relevant devices or components according to embodiments of the present disclosure described herein, such as, for example, an external controller, a timing controller, power management circuit, a data driver, and a gate driver, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of ordinary skill in the art should recognize that the functionality of various computing/electronic devices may be combined or integrated into a single computing/electronic device, or the functionality of a particular computing/electronic device may be distributed across one or more other computing/electronic devices without departing from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and equivalents thereof.

What is claimed is:

1. A display device comprising:
a display panel comprising a first pixel and a second pixel;
a reference gamma generator configured to generate a first reference gamma voltage and a second reference gamma voltage based on a driving mode;
a stain compensator configured to output a stain compensating data that compensates a stain of an image data based on the driving mode; and
a data driver configured to generate a first data voltage provided to the first pixel based on the first reference gamma voltage and the stain compensating data and a second data voltage provided to the second pixel based on the second reference gamma voltage and the stain compensating data,
wherein the stain compensator is configured to store a first stain compensating value and a second stain compensating value, and to generate the stain compensating data by selecting one from the first stain compensating value, the second stain compensating value, and a third stain compensating value generated by interpolating the first stain compensating value and the second stain compensating value based on the driving mode.

2. The display device of claim 1, wherein the first pixel comprises a first red sub-pixel, a first green sub-pixel, and a first blue sub-pixel, and
wherein the second pixel comprises a second red sub-pixel, a second green sub-pixel, and a second blue sub-pixel.

3. The display device of claim 1, wherein the reference gamma generator is configured to generate the first reference gamma voltage and the second reference gamma voltage having a same voltage level in a first driving mode, and wherein the reference gamma generator is configured to generate the first reference gamma voltage and the second reference gamma voltage having different voltage levels in a second driving mode and a third driving mode.

4. The display device of claim 3, wherein a difference between the first data voltage and the second data voltage in the second driving mode is greater than a difference between the first data voltage and the second data voltage in the third driving mode for a same grayscale value.

5. The display device of claim 3, wherein the first stain compensating value compensates the stain of the image data when the display panel is driven in the first driving mode, and
wherein the second stain compensating value compensates the stain of the image data when the display panel is driven in the second driving mode.

6. The display device of claim 3, wherein the stain compensator is configured to select the first stain compensating value in the first driving mode, to select the second stain compensating value in the second driving mode, and to select the third stain compensating value in the third driving mode.

7. The display device of claim 3, wherein the display device is configured to not be driven by a spatial division pixel driving method in the first driving mode and to be driven by a spatial division pixel driving method in the second driving mode and the third driving mode.

8. The display device of claim 1, wherein the stain compensator comprises:
a first memory configured to store the first stain compensating value;
a second memory configured to store the second stain compensating value;
a first calculator configured to generate the third stain compensating value by interpolating the first stain compensating value and the second stain compensating value; and
a second calculator configured to generate the stain compensating data by calculating the image data and one selected from the first stain compensating value, the second stain compensating value, and the third stain compensating value.

9. A display device comprising:
a display panel configured to display an image based on an image data;
an image analyzer configured to determine whether the image data comprises a set pattern, and to output a charging ratio of the image data as an image analyzing signal when the image data comprises the set pattern;
a stain compensator configured to output a stain compensating data that compensates a stain of the image data based on the image analyzing signal and the image data; and
a data driver configured to generate a data voltage provided to a pixel based on the stain compensating data,
and
wherein the stain compensator is configured to store a first stain compensating value and a second stain compensating value, and to generate the stain compensating data by selecting one from the first stain compensating value, the second stain compensating value, and a third stain compensating value generated by interpolating the first stain compensating value and the second stain compensating value based on a driving mode.

10. The display device of claim 9, wherein the pixel comprises a red sub-pixel, a green sub-pixel, and a blue sub-pixel.

11. The display device of claim 9, wherein the first stain compensating value compensates the image data having a minimum charging ratio, and the second stain compensating value compensates the image data having a maximum charging ratio.

12. The display device of claim 11, wherein the stain compensator is configured to generate the stain compensating data by selecting the first stain compensating value when the image analyzing signal comprises the minimum charging ratio,
wherein the stain compensator is configured to generate the stain compensating data by selecting the second stain compensating value when the image analyzing signal comprises the maximum charging ratio, and
wherein the stain compensator is configured to generate the stain compensating data by selecting a third stain compensating value generated by interpolating the first stain compensating value and the second stain compensating value when the image analyzing signal comprises a charging ratio between the minimum charging ratio and the maximum charging ratio.

13. The display device of claim 9, wherein the stain compensator comprises:
a first memory configured to store the first stain compensating value;
a second memory configured to store the second stain compensating value;
a first calculator configured to calculate the third stain compensating value by interpolating the first stain compensating value and the second stain compensating value; and
a second calculator configured to generate the stain compensating data by calculating the image data and one selected from the first stain compensating value, the second stain compensating value, and the third stain compensating value.

14. A display device comprising:
a display panel configured to display an image based on an image data;
a stain compensator configured to output a stain compensating data that compensates a stain of the image data; and
a data driver configured to generate a data voltage based on the stain compensating data,
wherein the stain compensator is configured to store a first stain compensating value and a second stain compensating value, and to generate the stain compensating data by selecting one from the first stain compensating value, the second stain compensating value, and a third stain compensating value generated by interpolating the first stain compensating value and the second stain compensating value based on a driving mode of the display panel.

15. The display device of claim 14, wherein the display panel comprises a first pixel and a second pixel,
wherein the display panel is configured to not be driven by a spatial division pixel driving method in a first driving mode and to be driven by a spatial division pixel driving method in a second driving mode and a third driving mode, and
wherein a difference of a first data voltage provided to the first pixel and a second data voltage provided to the second pixel in the second driving mode is greater than a difference of the first data voltage and the second data voltage in the third driving mode.

16. The display device of claim 15, wherein the stain compensator is configured to select the first stain compensating value in the first driving mode, to select the second stain compensating value in the second driving mode, and to select the third stain compensating value in the third driving mode.

17. The display device of claim 14, wherein the first stain compensating value compensates the image data having a minimum charging ratio, and the second stain compensating value compensates the image data having a maximum charging ratio.

18. The display device of claim 17, wherein the stain compensator is configured to generate the stain compensating data by selecting the first stain compensating value when an image analyzing signal that represents a charging ratio of the image data comprises the minimum charging ratio,
wherein the stain compensator is configured to generate the stain compensating data by selecting the second stain compensating value when the image analyzing signal comprises the maximum charging ratio, and
wherein the stain compensator is configured to generate the stain compensating data by selecting the third stain compensating value generated by interpolating the first stain compensating value and the second stain compensating value when the image analyzing signal comprises a charging ratio between the minimum charging ratio and the maximum charging ratio.

* * * * *